H. WOLKE.
MECHANICAL MOVEMENT.
APPLICATION FILED JAN. 3, 1907.
999,937.
Patented Aug. 8, 1911.
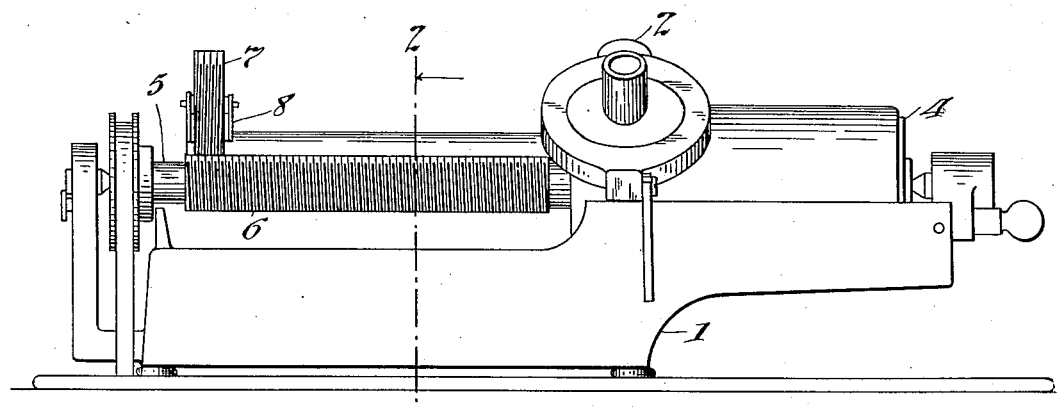
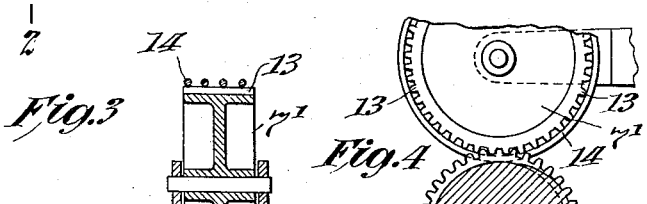
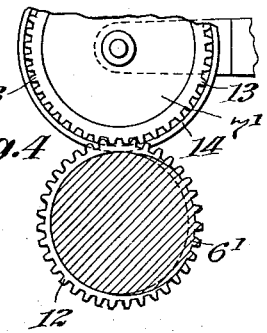
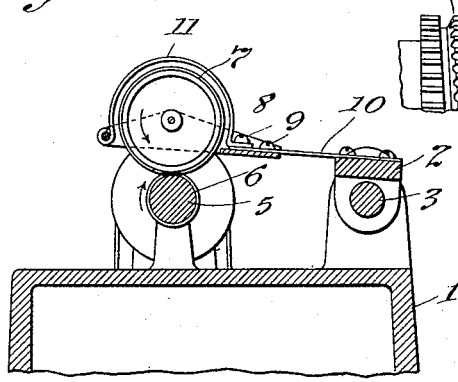
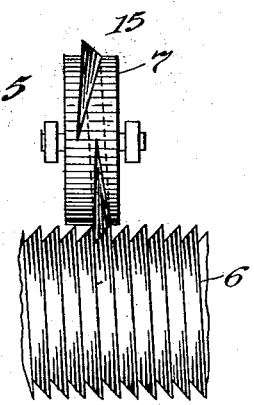

UNITED STATES PATENT OFFICE.

HERMAN WOLKE, OF ORANGE, NEW JERSEY, ASSIGNOR, BY MESNE ASSIGNMENTS, TO THOMAS A. EDISON, INCORPORATED, OF WEST ORANGE, NEW JERSEY, A CORPORATION OF NEW JERSEY.

MECHANICAL MOVEMENT.

999,937.  Specification of Letters Patent.  Patented Aug. 8, 1911.

Application filed January 3, 1907. Serial No. 350,649.

*To all whom it may concern:*

Be it known that I, HERMAN WOLKE, a citizen of the United States, residing at Orange, in the county of Essex and State of New Jersey, have invented certain new and useful Improvements in Mechanical Movements, of which the following is a description.

My invention relates to means for imparting a progressive movement to the carriage which carries the reproducer or recorder of a phonograph whereby the same is fed transversely with respect to the direction of movement of the surface of the record and the stylus traces upon the same a spiral path. In devices of this character it has been the usual practice heretofore to provide a feed screw cut with a very fine thread, such as 100 threads to the inch, and to secure to the carriage a spring arm provided with a nut for engagement with said screw, thereby feeding the carriage forward a distance .01″ for each revolution of the feed screw. It has sometimes seemed desirable to feed the carriage at a slower rate of speed than this, but for mechanical reasons the production and operation of a screw of finer pitch than that referred to is practically impossible. According to my invention, however, I am able to obtain a very low rate of travel for the carriage, such, for example, as would be produced by a feed screw having 200 threads to the inch and operating in the manner described, without, however, using a screw of any finer pitch than is now used, and in fact, if desired, the pitch of the feed screw may be increased very considerably and at the same time the rate of feed decreased. This result is accomplished by substituting for the feed nut referred to, a rotatable screw or threaded wheel, the thread of which is the reverse of that of the feed screw and of a smaller inclination with respect to a vertical plane, as, for instance, when a wheel of greater diameter than the feed screw is threaded with the same pitch. Such a wheel when supported in frictional engagement with the feed screw will be rotated thereby, and on account of the inclination of the thread of the feed screw being slightly greater than that of the wheel, the screw will exert a thrust thereon and will cause the same to travel at a rate which is equal to the difference between the inclination of threads, which depends upon the relative diameters of the two parts. For instance, if the wheel be of twice the diameter of the feed screw and both are threaded with a screw of .01 of an inch pitch, each revolution of the feed screw will feed the wheel forward only .005 of an inch. As another example, if the diameter of the feed screw is 5/8″ and its thread 1/16″ pitch, and the diameter of the wheel 3/4″ and pitch 1/16″, each revolution of the feed screw will feed the wheel forward 1/96″; or if the threads on these members are 1/32″ pitch, the feed for each revolution will be 1/192″. My invention may be properly termed a differential feed, because the forward movement is equal to the difference in the inclination of the threads and may be calculated (when both screws are of same pitch) by subtracting from the pitch of the feed screw the product of the pitch multiplied by a fraction whose numerator is the diameter of the feed screw and whose denominator is the diameter of the other screw.

Referring to the accompanying drawings, Figure 1 is a front elevation of a phonograph provided with a feed device constructed in accordance with my invention; Fig. 2 is a section on line 2—2 of Fig. 1; Fig. 3 is a front elevation, largely in section, of a modified structure; Fig. 4 is a side elevation partly in section, of the device of Fig. 3, and Fig. 5 is a front elevation of a second modification.

Corresponding parts are designated by the same reference numerals in the several views:

The phonograph shown is of the Edison type, and comprises the usual body 1 and carriage 2 which slides upon the back rod 3. The mandrel 4 is mounted upon the main shaft 5 which is provided with a feed screw 6 so threaded as to produce a forward movement of the carriage 2 when the main shaft is rotated in the proper direction. This feed screw, as has been explained, is ordinarily made of a pitch equal to .01″. This pitch may be used if desired, or a screw of greater pitch may be used, as before indicated. In engagement with the thread of the screw 6 is a rotatably mounted wheel or screw 7 of greater diameter than the screw 6 and the thread of which is reversed with respect to the thread of the said screw 6. For example, if the screw 6 is a right handed screw, then the thread of the screw 7 is left handed. The wheel 7 is journaled in bearings formed in a yoke 8, which is secured by screws 9 to a spring arm 10 which extends forward from and is secured to the carriage 2. Obviously the wheel 7 will be in yielding frictional engagement with the screw 6, the engaging pressure being due to a portion of the weight of the carriage 2, the spring arm 10 being so set as to produce the proper pressure between the screw 6 and wheel 7. Preferably a semi-circular guard 11 partly encircles the wheel 7 said guard being carried by the yoke 8. It is not absolutely necessary that the pitch of the two screws be the same because, for example, the screw 6 may be provided with a double thread, the pitch of each thread being, say, one fiftieth of an inch, the turns of one thread being of course, exactly midway between the turns of the other thread. In this case the pitch of the wheel 7 could be .01″. The thread upon the traveling wheel may consist of a single convolution 15 as shown in Fig. 5.

Instead of relying upon friction to cause rotation of the wheel 7, the same may be positively driven by the feed screw as in the device of Figs. 3 and 4. Here the feed screw 6′ which is preferably of coarse pitch, is milled longitudinally to form gear teeth 12 the depth of which is less than the depth of the thread of the screw. The wheel 7′ is a spur gear having teeth 13 extending continuously across the width thereof. A wire 14 is secured to the exterior of the gear 7′ in such a way as to form a spiral whose pitch is the same as that of the screw 6′ and whose direction is reverse. The teeth 13 are adapted to mesh with the teeth 12, while the wire 14 engages the thread of the screw 6′ so that the gear 7′ is driven by the said screw.

While I have described my invention as applied to a phonograph for producing the desired feed of the traveling carriage, it is obviously not limited to such use, and may be applied to any mechanism whatever for converting rotary movement into progressive lineal movement.

Having now described my invention, what I claim as new and desire to secure by Letters Patent, is as follows:

1. A mechanical movement comprising a longitudinally immovable feed screw, a movable carriage, and means for progressing said carriage along said feed screw, comprising a screw mounted free to rotate and carried by the carriage with its thread constantly in mesh with that of said feed screw during the progression of the carriage, said screws being of reverse thread and the diameter of the feed screw being less than that of the traveling screw, substantially as set forth.

2. A mechanical movement comprising a longitudinally immovable feed screw, a movable carriage, and means for progressing said carriage along said feed screw, comprising a single screw mounted free to rotate and carried by the carriage with its thread constantly in mesh with that of said feed screw during the progression of the carriage, said screws being of reverse thread and of the same pitch, the diameter of the feed screw being less than that of the traveling screw, substantially as set forth.

3. A mechanical movement comprising a longitudinally immovable feed screw, a movable carriage, and means for progressing said carriage along said feed screw, comprising a single screw mounted free to rotate and carried by the carriage with its thread constantly in mesh with that of said feed screw during the progression of the carriage, said screws being of reverse thread, and the thread of the traveling screw being of smaller inclination than that of the feed screw, substantially as set forth.

4. A mechanical movement comprising a feed screw, a movable carriage, and means for progressing said carriage along said feed screw, comprising a screw mounted free to rotate and carried by the said carriage in constant yielding engagement with said feed screw during the progression of the carriage, said screws being of reverse thread, substantially as set forth.

5. A mechanical movement, comprising a feed screw, a movable carriage, a spring arm secured to said carriage, and means for progressing said carriage along said feed screw comprising a screw mounted free to rotate and secured to said arm and engaging said feed screw during the progression of the carriage, said screws being of reverse thread, substantially as set forth.

6. A mechanical movement, comprising a feed screw formed with radial teeth, and also with a screw thread, a movable carriage, and means for progressing said carriage along said feed screw with a differential movement, comprising a rotatable screw formed around its entire periphery with radial teeth and also with a screw thread, and carried by said carriage, the thread and teeth of said rotatable screw being in constant engagement with the thread and teeth of said feed screw during the progression of the carriage, and said screws being of reverse thread, substantially as set forth.

7. A mechanical movement comprising a feed screw formed with a helical thread and also with radial gear teeth of a depth less than that of the thread, a carriage movable axially of said screw, and a wheel carried by said carriage, said wheel formed with gear teeth and with a spiral convolution surrounding said teeth, of the same pitch as the thread of the screw, the thread and teeth of said screw being in engagement with the convolution and teeth of said wheel, substantially as set forth.

8. In a phonograph, the combination with the sound box, a support for the same, and the mandrel, of means for causing a relative shift of said sound box support and mandrel axial of said mandrel, comprising a feed screw rotatable with said mandrel and a threaded wheel mounted free to rotate and carried by the sound box support, with its thread constantly in mesh with that of said feed screw, during relative movement in one direction between said support and said screw, the diameter of said wheel being different from that of said screw, said mandrel and support being relatively shiftable members and one of said members being immovable longitudinally of said mandrel, substantially as set forth.

This specification signed and witnessed this 21st day of December 1906.

HERMAN WOLKE.

Witnesses:
FRANK L. DYER,
ANNA R. KLEHM.